(12) United States Patent
Meeker et al.

(10) Patent No.: US 7,470,067 B2
(45) Date of Patent: Dec. 30, 2008

(54) WHEEL BEARING ASSEMBLY MOUNT WITH FORCE ATTENUATION

(75) Inventors: Steven E. Meeker, Norwalk, OH (US); David B. Mischler, Marblehead, OH (US)

(73) Assignee: Kyklos Bearing International, Inc., Novi, MI (US)

( * ) Notice: Subject to any disclaimer, the term of this patent is extended or adjusted under 35 U.S.C. 154(b) by 317 days.

(21) Appl. No.: 11/271,606

(22) Filed: Nov. 10, 2005

(65) Prior Publication Data

US 2006/0133708 A1 Jun. 22, 2006

Related U.S. Application Data

(60) Provisional application No. 60/637,546, filed on Dec. 20, 2004.

(51) Int. Cl.
*F16C 35/06* (2006.01)
(52) U.S. Cl. ..................................................... 384/544
(58) Field of Classification Search ................. 384/544, 384/589, 535, 581, 192, 215; 301/105.1
See application file for complete search history.

(56) References Cited

U.S. PATENT DOCUMENTS

| | | | | |
|---|---|---|---|---|
| 2,812,987 A | * | 11/1957 | Eilmann | 384/535 |
| 3,360,998 A | * | 1/1968 | Griffel | 474/153 |
| 3,372,962 A | * | 3/1968 | Linsley | 384/535 |
| 3,774,933 A | * | 11/1973 | Asberg | 280/105 |
| 4,027,931 A | | 6/1977 | Streifert | 384/117 |

(Continued)

FOREIGN PATENT DOCUMENTS

EP 1288021 A2 * 3/2003

*Primary Examiner*—Thomas R Hannon
(74) *Attorney, Agent, or Firm*—Ryndak & Suri LLP

(57) ABSTRACT

A support member (14) for rotatably coupling a first element to a second element. The support member includes a sleeve (50) for rotatably supporting the first element, and a flange (56) having a concave central portion. The flange (56) is coupled to the sleeve (50). The flange (56) has bearing surfaces (68a, 68b) formed thereon along which the flange (56) is mounted to the second element. In one embodiment, the first element is a spindle (12) of a vehicle wheel assembly (11) and is rotatably supported in the sleeve (50) by rollable bearing elements positioned therein. Multiple tapered lobes (64) extend outwardly from the sleeve (50), and the support member (14) is mounted to a vehicle via bearing surfaces (68a, 68b) along the lobes (64). Due to the concave portion of the flange (56), the bearing surfaces (68a, 68b) are the only portions of the flange (56) in contact with the vehicle when the support member (14) is secured to the vehicle, reducing the contact area between the flange (56) and the vehicle, and reducing impact forces transferred to the bearings. A portion of the flange (56) may act as a spring member, enabling the flange (56) to flex in response to an impact load experienced by the wheel bearing assembly (11). This enables the flange (56) to absorb a portion of the side impact load, thereby attenuating the portion of the load transmitted to the bearings. A wheel bearing assembly (10) incorporating the support member (14) is also disclosed.

10 Claims, 3 Drawing Sheets

U.S. PATENT DOCUMENTS

| | | | |
|---|---|---|---|
| 4,789,253 A | 12/1988 | Perego | 384/517 |
| 5,314,255 A * | 5/1994 | Schwerdt | 384/536 |
| 5,364,194 A | 11/1994 | Lubin | 384/493 |
| 5,931,585 A * | 8/1999 | Malchow et al. | 384/535 |
| 6,062,736 A | 5/2000 | Zernickel | 384/581 |
| 6,067,896 A * | 5/2000 | Elorza | 99/337 |
| 6,224,533 B1 | 5/2001 | Bengtsson et al. | 494/82 |
| 6,376,952 B1 | 4/2002 | Stenta | 310/90 |
| 6,517,246 B2 | 2/2003 | Blakley | 384/192 |
| 2003/0025385 A1* | 2/2003 | Morimoto et al. | 301/105.1 |

\* cited by examiner

US 7,470,067 B2

WHEEL BEARING ASSEMBLY MOUNT WITH FORCE ATTENUATION

CROSS REFERENCE TO RELATED APPLICATIONS

This application claims the benefit of provisional application Ser. No. 60/637,546, filed on Dec. 20, 2004.

BACKGROUND OF THE INVENTION

This invention relates to wheel bearing assemblies for supporting a wheel and, more particularly, to an apparatus and method for attenuating impact forces transmitted to ball bearings in a wheel bearing assembly.

A wheel bearing assembly is used between a spindle and either a support member or a wheel hub (depending on the particular assembly configuration) for permitting relative rotation between the spindle and the support member or wheel hub. As larger diameter wheels, lower profile tires, and more rigid vehicle suspension components are employed in newer vehicle platforms, the vehicle wheel bearing assembly has become much more susceptible to damage resulting from side impact forces between the vehicle wheels and objects such as curbs. These side impact forces act in a direction generally parallel to the axis of the spindle and are transmitted to the bearing rolling elements (such as balls or rollers) and thence to the bearing raceways in which the rolling elements travel. Where the transferred forces create stresses that exceed the elastic limit of the raceway material, the rolling elements may produce permanent surface indentations in the raceways (a phenomenon known as "Brinelling".) This can lead to undesirable noise and vibration in the bearing during use. To help prevent Brinelling, previous designs have focused on increasing the diameter or relative size of the rolling elements of the bearing. However, this approach increases the mass, weight and cost of the bearing components and can render the bearing design inefficient in terms of vehicle straight-running and cornering capabilities.

For the reasons outlined above, it is desirable to dampen or otherwise reduce the impact forces transmitted to the bearing rolling elements.

SUMMARY OF THE INVENTION

The present invention provides a support member for a wheel bearing assembly. The support member has a central sleeve for securing bearing members therein, and a mounting flange extending from the central sleeve for securing the bearing assembly to a portion of a vehicle. The flange has a concave central portion coupled to the sleeve. The flange tapers down from the central portion into three, substantially equally angularly spaced-apart lobes projecting outwardly from the central portion. The junction between the central sleeve and the central portion of the flange has a radius formed therealong to help relieve any stress concentrations at the junction during flexing of the flange. One or more substantially flat, coplanar bearing surfaces are also formed along each of the lobes. The bearing surfaces abut the vehicle and are designed to rest flush against the vehicle when the support member is secured to the vehicle, providing a relatively limited contact area between the mounting flange and the vehicle. A chamfer may be formed at an end portion of each of the lobes to further reduce the contact area between the flange and the vehicle. Due to the generally concave shape of the portion of the mounting flange residing radially inwardly of the bearing surfaces, the central portion of the flange is spaced apart from the vehicle, and the bearing surfaces are the only portions of the flange in contact with the vehicle when the support member is secured to the vehicle. This substantially reduces the contact area between the mounting flange and the vehicle, thereby reducing and localizing any impact forces transferred to the bearing members. In addition, the central portion of the flange may be configured to act as a spring member. This enables the flange central portion to flex in response to a side impact load experienced by a wheel assembly attached to the vehicle via the wheel bearing assembly. This flexibility enables the flange to absorb a portion of the side impact load, thereby dampening or attenuating the portion of the load transmitted to the bearings.

DETAILED DESCRIPTION

Figure 1:
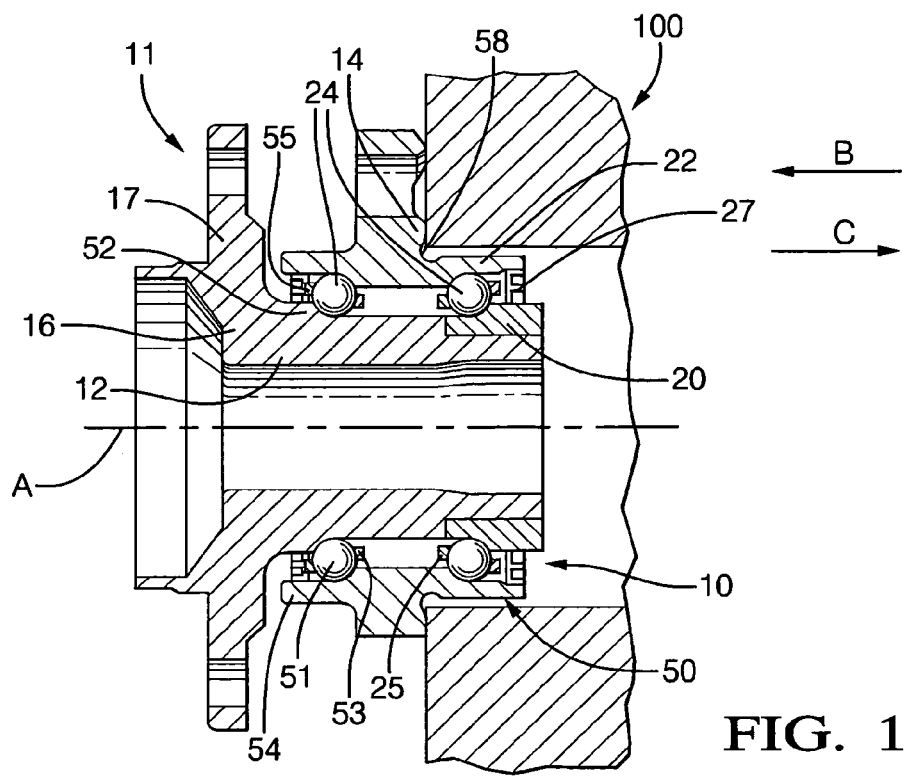
FIG. 1 is a cross-sectional side view of a wheel assembly secured to a wheel bearing assembly in accordance with the present invention.

A wheel bearing assembly 10 is shown in FIG. 1 for supporting a wheel (not shown) in a wheel assembly 11. A spindle 12 defines a rotational axis A, and a support member 14 supports the spindle 12. Support member 14 may be secured to a portion 100 of the vehicle by fasteners or the like. A wheel hub 16 has a flange 17 for securing the wheel thereto and is supported on spindle 12 adjacent support member 14. In the embodiment shown in FIG. 1, wheel hub 16 is integrally formed with spindle 12. Wheel hub 16 and spindle 12 are rotatable about rotational axis A. A drive mechanism (not shown) is coupled to spindle 12 for rotationally driving the wheel. Bearing assembly 10 is arranged to permit wheel hub 16 and spindle 12 to rotate relative to support member 14, with support member 14 rotatably supporting spindle 12. For purposes of the present invention, spindle 12 is "rotatably supported" by support member 14 when the spindle is supported so as to permit rotation of the spindle.

Wheel bearing assembly 10 has first 20 and second 22 bearing members in spaced relation with one another and a plurality of bearings 24, such as ball bearings, retained by a cage 25. Any of a variety of other types of rollable bearing elements (for example, needle roller bearings) may also be used. Bearings 24 are interposed between first 20 and second 22 bearing members to permit relative rotation between the bearing members 20, 22 about rotational axis A. First bearing member 20 is adjacent spindle 12 and second bearing member 22 is adjacent either the wheel hub or the support member, depending on the particular configuration of the wheel assembly 11. In the embodiment shown in FIG. 1, second bearing member 22 is integrally formed with support member 14. Bearing assembly 10 further includes a bearing seal 27 interposed between spindle 12 and support member 14 adjacent bearings 24 to prevent debris from contaminating bearings 24. It is preferred that the diameters of first 20 and second 22 bearing members not change significantly during the assembly process so that bearing seal 27 will fit properly.

Wheel bearing assembly 10 also has third 52 and fourth 54 bearing members in spaced relation with one another and a plurality of bearings 51, such as ball bearings, retained by a cage 53. Bearings 51 are interposed between third 52 and fourth 54 bearing members to permit relative rotation between the bearing members 52, 54 about rotational axis A. In the embodiment shown, third bearing member 52 is integrally formed with spindle 12 and fourth bearing member 54 is integrally formed with support member 14. A bearing seal 55 is interposed between spindle 12 and support member 14 adjacent to bearings 51 to prevent debris from contaminating bearings 51. It is preferred that the diameters of third 52 and fourth 54 bearing members not change significantly during the assembly process so that bearing seal 55 will fit properly.

Figure 2:
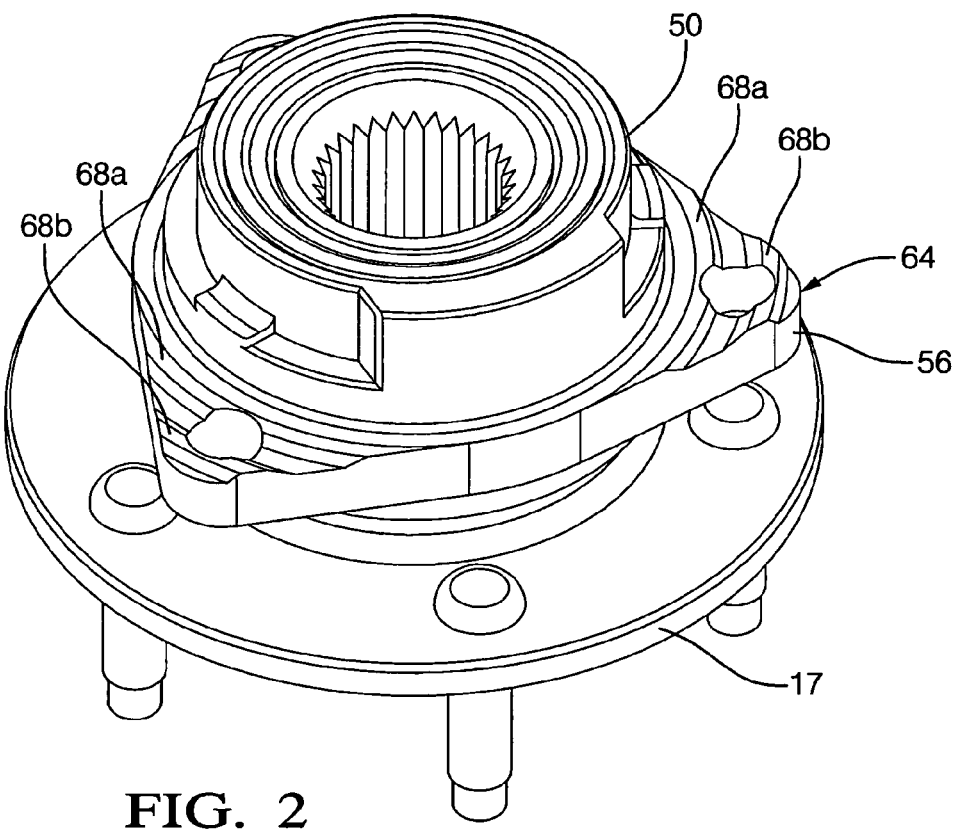
FIG. 2 is a perspective view of a wheel assembly secured to the wheel bearing assembly of FIG. 1.

Referring to FIGS. 1-5, support member 14 rotatably couples spindle 12 to a portion 100 of a vehicle body. For purposes of the present invention, spindle 12 is "rotatably coupled" to vehicle portion 100 when the spindle is coupled to the vehicle so as to permit rotation of the spindle with respect to vehicle portion 100. Support member 14 includes an annular central sleeve 50 incorporating and/or securing bearing members 20, 22, 52, 54 therein to rotatably support spindle 12 therein. A mounting flange 56 extends from sleeve 50, for securing bearing assembly 10 to portion 100 of the vehicle. Flange 56 is secured to the vehicle along a mounting face 58 (FIGS. 3-5) of the flange. Flange 56 has a concave central portion 60 along which the flange is coupled to sleeve 50. In the embodiment shown in FIGS. 1-5, flange 56 includes a plurality of equally angularly spaced-apart lobes 64 extending outwardly from central portion 60. In the embodiment shown, three lobes are formed spaced apart approximately 120°; however, additional lobes may be formed, depending on the vehicle attachment requirements of a particular application. In addition, all of the lobes formed need not be equally angularly spaced-apart. Also, as seen in FIG. 2, width dimensions lobes 64 taper from a relatively larger width dimension proximate sleeve 50 to a relatively smaller width dimension spaced radially outwardly from the sleeve. The lobed configuration reduces the amount of material used in forming the flange. Alternatively, a flange without separate lobes may be used. The junction between central sleeve 50 and flange central portion 60 has a radius 61 to help relieve any stress concentrations at the junction during flexing of mounting flange 56 with respect to central sleeve 50. Flange 56 is substantially concave between lobes 64 (i.e., flange central portion 60 bows inward relative to lobes 64, in a direction indicated by arrow B (FIG. 1), generally away from the vehicle.

Figures 3, 4, 5:
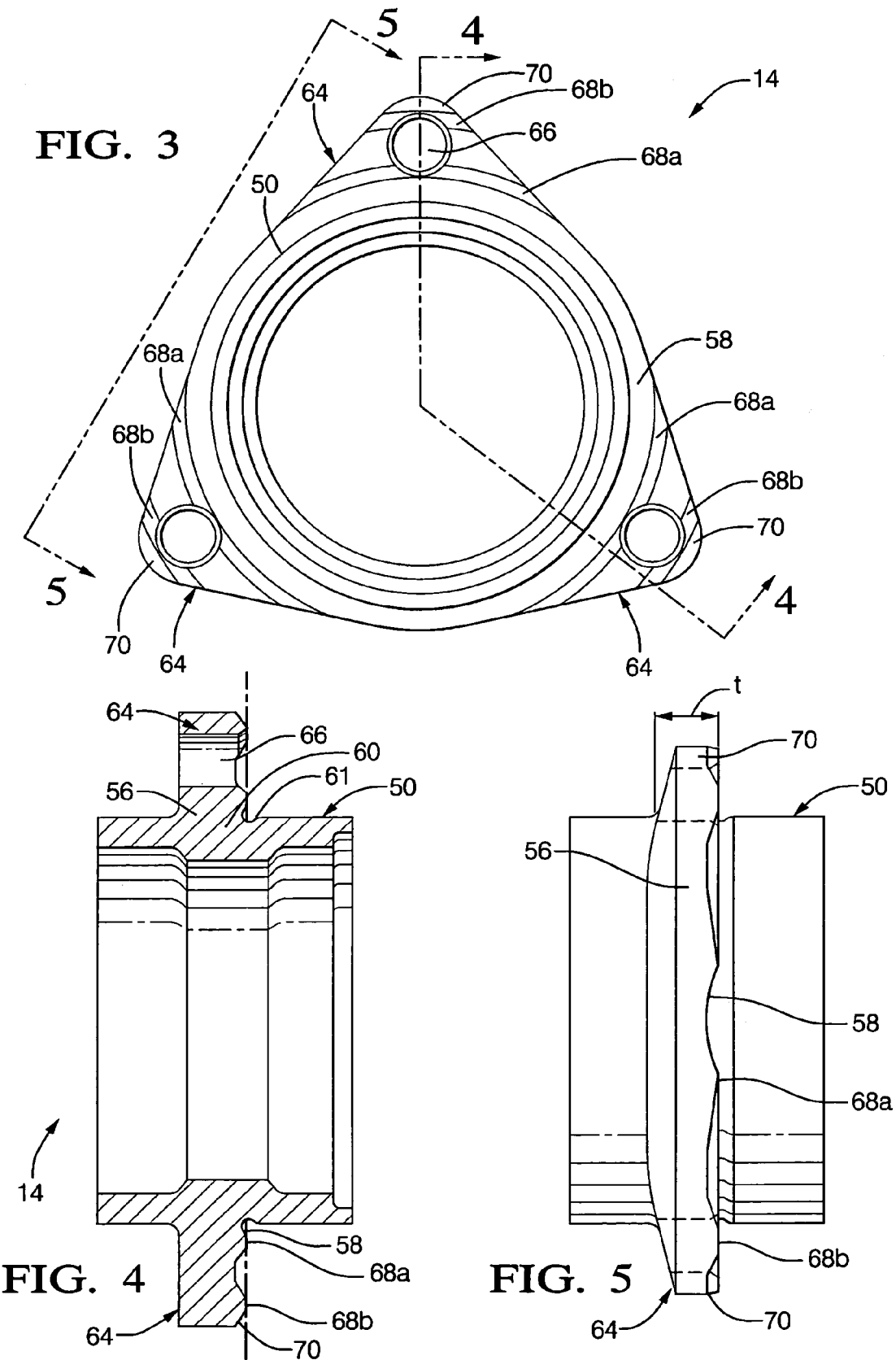
FIG. 3 is a plan view of a first embodiment of a support member incorporated into a wheel bearing assembly of the present invention.
FIG. 4 is a cross-sectional view of the first embodiment of the support member taken along line 4-4 of FIG. 3.
FIG. 5 is a side view of the support member of FIG. 3 taken along line 5-5 of FIG. 3.

Referring to FIGS. 3 and 4, one or more through-holes 66 are formed in each of lobes 64 for fasteners used in attaching support member 14 to the vehicle. In addition, one or more substantially flat bearing surfaces 68a, 68b are formed along each of lobes 64. Bearing surfaces 68a, 68b abut portion 100 of the vehicle and are designed to rest flush against the portion of the vehicle when support member 14 is attached to the vehicle, providing a relatively limited contact area between mounting flange 56 and the vehicle. On each lobe 64 of the embodiment shown, two bearing surfaces 68a and 68b are radially spaced apart to straddle opposite sides of through-hole 66. Also, in the embodiment shown, bearing surfaces 68a, 68b are secured to a single, substantially flat surface on the vehicle. In this instance, bearing surfaces 68a, 68b are formed (for example, by machining) so as to be substantially coplanar to help ensure sufficient abutting contact with vehicle portion 100. A chamfer 70 may be formed at an end portion of each of lobes 64 to further reduce the contact area between flange 56 and the vehicle.

Referring again to FIGS. 1-5, due to the concave portion of mounting flange 56, a large portion of mounting face 58 is spaced apart from the vehicle. Thus, rather than the entire mounting face 58 being in contact with the vehicle, bearing surfaces 68a, 68b are the only portions of flange 56 in contact with the vehicle when support member 14 is secured to the vehicle. This substantially reduces the contact area between mounting flange 56 and the vehicle, thereby localizing and reducing any impact forces transferred to bearing members 20, 22, 52, 54 through support member 14. In addition, mounting flange 56 is shaped to permit deflection of the flange in response to side impact loads applied to wheel assembly 11. Attachment of bearing members 20, 22, 52, 54 to the vehicle via lobes 64 and the generally concave shape of mounting face 58 radially inwardly of bearing surfaces 68a enable the flange to flex, in the direction indicated by arrow C (FIG. 1), in response to a side impact load experienced by wheel assembly 11 and transmitted to bearing members 20, 22, 52, 54. This flexibility enables flange 56 to absorb a portion of the side impact load, thereby dampening or attenuating the portion of the load transmitted to the bearings.

Support member 14 may be fabricated from steel (for example, a high-carbon steel forging) with conventional machining operations used to form bearing surfaces 68a, 68b having the coplanarity required for a given application.

Wheel bearing assembly 10 is configured to be self-retaining to wheel assembly 11, and may be secured to the spindle using any one of a variety of known methods. Some exemplary methods of retaining bearing assembly 10 to wheel assembly 11 are described in U.S. Pat. Nos. 6,574,865, 6,485, 187, and 6,622,377, incorporated herein by reference.

Referring to FIGS. 3 and 5, a thickness dimension t of mounting flange 156 may be varied to generally improve the force-deflection characteristics of the flange. The thickness t of the mounting flange may be decreased along a direction proceeding from sleeve 50 toward bearing surfaces 68a, effectively providing a taper to flange 56. This configuration helps minimize the weight of flange 56 while optimizing the force-deflection characteristics of the portion of the flange residing radially inwardly of bearing surfaces 68a. The thickness of the flange may also be varied as described in instances where a solid (non-lobed) flange configuration is used.

Figure 6:
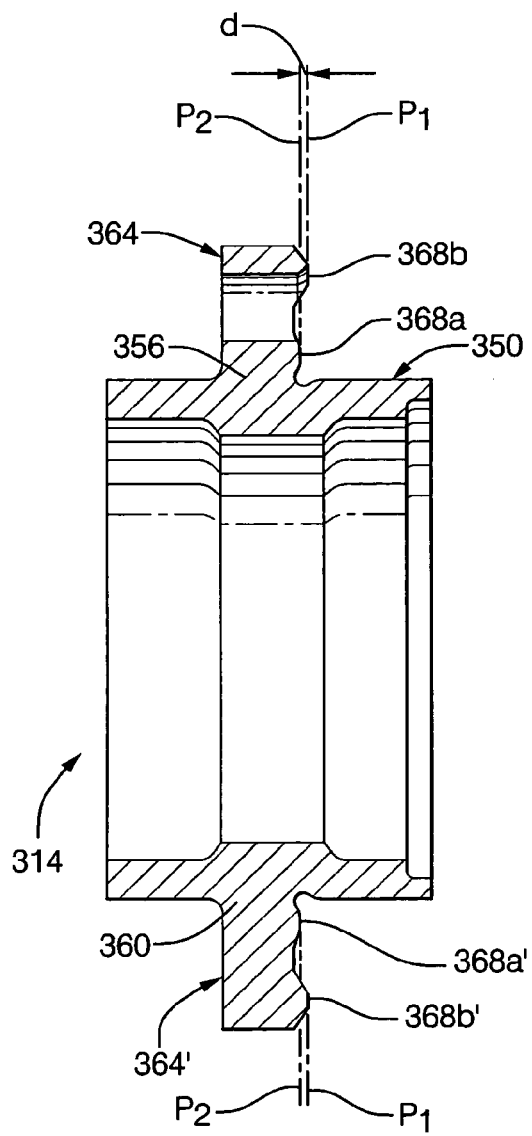
FIG. 6 is a cross-sectional view of another alternative embodiment of the support member of the present invention.

In FIG. 6, like numerals are used to identify features similar to those identified in FIGS. 3 and 4. Referring to FIG. 6, in an alternative embodiment, bearing surfaces 368b, 368b' define a first mounting plane P1 and bearing surfaces 368a, 368a' define a second mounting plane P2 parallel to first mounting plane P1. First mounting plane P1 is spaced apart from the second mounting plane P2 in the direction of concavity of the flange. That is, bearing surfaces 368a, 368a' on lobes 364, 364' are slightly recessed a distance d (in the direction of arrow B (FIG. 1)) with respect to a corresponding bearing surfaces 368b, 368b' on the lobes such that, during application of fasteners to secure flange 356 to the vehicle, bearing surfaces 368b, 368b' contact the vehicle prior to bearing surfaces 368a, 368a' contacting the vehicle. As used herein, the direction of concavity of the flange is defined as the direction in which the concave flange "opens". In the configuration described, bearing surfaces 368a, 368a' contact the vehicle only when the fasteners have been sufficiently tightened, which causes the portions of the flange residing between bearing surfaces 368a and 368b and the portions of the flange residing between 368a' and 368b' to deflect during tightening of the fasteners, thereby imparting a pre-load to flange 356 (i.e., flange 356 is pre-stressed during attachment to the vehicle). This flange pre-load increases the clamping force, or attachment force, with which the flange is secured to the vehicle.

Figure 7:
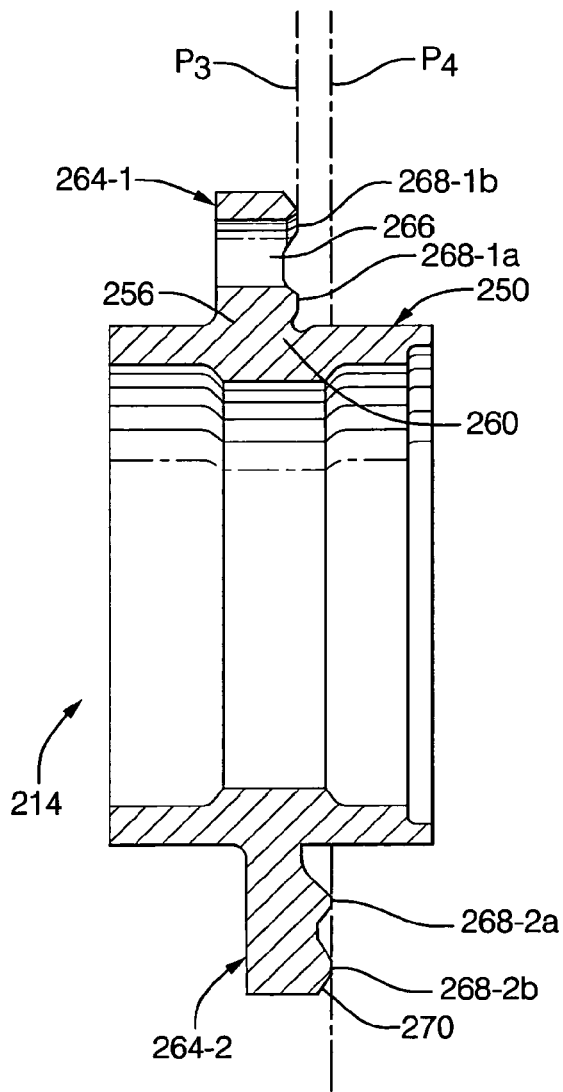
FIG. 7 is a cross-sectional view of yet another alternative embodiment of the support member of the present invention.

In yet another alternative embodiment, shown in FIG. 7, lobes 264-1 and 264-2 are attached to separate, non-coplanar portions of the vehicle. Lobe 264-1 is secured to a surface of the vehicle along a mounting plane P3, while lobe 264-2 is secured to a surface of the vehicle along a mounting plane P4, which is not coplanar with mounting plane P3. In this case, the local geometries of mounting flange 256 in the regions of lobes 264-1 and 264-2, the coplanarity of bearing surfaces 268-1a, 268-1b, and the coplanarity of bearing surfaces 268-2a, 268-2b along each of the lobes are adjusted so that the bearing surfaces on each lobe may be secured flush with their respective portions of the vehicle.

The system described herein for rotatably coupling elements is not restricted to the coupling of a wheel spindle to the body of a vehicle. Rather, the system may be utilized in any application in which it is desirable to dampen or attenuate the impact, shock, or vibration forces transmitted to rotating bearing elements.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

The invention claimed is:

1. A support member for rotatably coupling a a spindle to a vehicle, the support member comprising:
   a flange including a portion that is concave towards the vehicle and a mounting portion extending from the concave portion for mounting the support member to the vehicle; and
   a sleeve in the concave portion for rotatably supporting at least a portion of the spindle therein.

2. The support member of claim 1 wherein the at least a portion of the spindle is rotatably supported in the sleeve by a plurality of rollable bearing elements positioned therealong.

3. The support member of claim 1 wherein the mounting portion includes a plurality of spaced-apart lobes, each lobe including at least one bearing surface formed thereon for mounting the lobe to the vehicle therealong.

4. The support member of claim 3 wherein a width dimension of at least one of the lobes tapers from a relatively larger width dimension proximate the sleeve to a relatively smaller width dimension spaced radially outwardly from the sleeve.

5. The support member of claim 1 wherein the flange includes a first bearing surface and a second bearing surface positioned intermediate the first bearing surface and the sleeve, the first bearing surface defining a first mounting plane, the second bearing surface defining a second mounting plane parallel to the first mounting plane, and wherein the first mounting plane is spaced apart from the second mounting plane in the direction of concavity of the flange.

6. The support member of claim 1 wherein a thickness dimension of the flange tapers from a relatively larger thickness dimension proximate the sleeve to a relatively smaller thickness dimension spaced radially outwardly from the sleeve.

7. A support member for rotatably coupling a first element to a second element, the support member comprising:
   a sleeve for rotatably supporting at least a portion of the first element therein; and
   a flange including a concave portion coupled to the sleeve, and a mounting portion extending from the concave portion for mounting the support member to the second element,
   the mounting portion including a plurality of spaced-apart lobes, each lobe including at least one bearing surface formed thereon for mounting the lobe to the second element therealong,
   the mounting portion also including a first lobe and a second lobe, the at least one bearing surface formed on the first lobe defining a first mounting plane, and the at least one bearing surface formed on the second lobe defining a second mounting plane parallel to and spaced apart from the first mounting plane.

8. A wheel bearing assembly for a vehicle wheel comprising:
   a spindle;
   a support member including a portion that is concave towards the vehicle for receiving a portion of the spindle therein; and
   a plurality of bearings interposed between the spindle and the support member for rotatably coupling the spindle to the support member,
   the support member also including a mounting portion extending from the concave portion for mounting the support member to the vehicle.

9. A support member for rotatably coupling a spindle to a vehicle, the support member comprising:
   a flange including a central portion and a mounting portion extending from the central portion for mounting the support member to the vehicle; and
   a sleeve formed in the central portion for rotatably supporting at least a portion of the spindle therein,
   wherein the central portion is spaced apart from the vehicle when the mounting portion is mounted to the vehicle.

10. A wheel bearing assembly for a vehicle wheel comprising:
   a support member in accordance with claim 9; and
   a spindle rotatably supported in the sleeve by at least one bearing interposed between the spindle and the support member.

* * * * *